(12) United States Patent
Getlichermann et al.

(10) Patent No.: US 7,037,593 B2
(45) Date of Patent: May 2, 2006

(54) SEALING MEMBRANE AND METHOD MAKING A SEALING MEMBRANE

(75) Inventors: Michel Getlichermann, Perwez (BE); Patrick Cogneau, Perwez (BE)

(73) Assignee: Performance Roof Systems S.A., Perwez (BE)

( * ) Notice: Subject to any disclaimer, the term of this patent is extended or adjusted under 35 U.S.C. 154(b) by 0 days.

(21) Appl. No.: 10/130,293

(22) PCT Filed: Nov. 30, 2000

(86) PCT No.: PCT/BE00/00142

§ 371 (c)(1),
(2), (4) Date: May 30, 2002

(87) PCT Pub. No.: WO01/40569

PCT Pub. Date: Jun. 7, 2001

(65) Prior Publication Data

US 2003/0017318 A1    Jan. 23, 2003

(30) Foreign Application Priority Data

Nov. 30, 1999 (EP) ................................ 99204042

(51) Int. Cl.
*D06N 5/00* (2006.01)
*B32B 11/00* (2006.01)
(52) U.S. Cl. ...................... 428/489; 428/523
(58) Field of Classification Search ............... 428/489, 428/500, 292.1, 343, 351, 353, 354, 355 R; 427/138
See application file for complete search history.

(56) References Cited

U.S. PATENT DOCUMENTS

| 4,419,469 | A | * | 12/1983 | Bohm et al. ................... 524/68 |
| 4,755,409 | A | * | 7/1988 | Harkness ................... 428/40.3 |
| 5,482,982 | A | | 1/1996 | Lakshmanan et al. |
| 5,516,829 | A | * | 5/1996 | Davis et al. ................. 524/411 |
| 5,824,401 | A | * | 10/1998 | Jenkins et al. .............. 428/215 |
| 6,156,827 | A | * | 12/2000 | Lemoine et al. .............. 524/59 |
| 6,360,506 | B1 | * | 3/2002 | Graae .......................... 52/408 |
| 6,723,794 | B1 | * | 4/2004 | Kawasaki et al. .......... 525/213 |

FOREIGN PATENT DOCUMENTS

| EP | 0 223 019 A1 | 5/1987 |
| EP | 273105 A | 7/1988 |
| EP | 0 313 735 A2 | 5/1989 |
| EP | 0 315 239 A1 | 5/1989 |
| EP | 0 553 513 A1 | 8/1993 |
| EP | 0 937 750 A1 | 8/1999 |
| WO | WO 97/24485 | 7/1997 |

OTHER PUBLICATIONS

Tranlsation of WO 97/24485.*
Derwent Abstract Translation of EP 937750 A1 (Derwent Acc. No. 1999-460735).*

* cited by examiner

Primary Examiner—Kevin M. Bernatz
(74) Attorney, Agent, or Firm—Jacobson Holman PLLC (57) ABSTRACT

A waterproofing membrane comprising a bituminous mass which comprises at least one olefinic polymer with an intrinsic crystallinity. The method of manufacturing a waterproofing membrane includes the application by coating from below on a top face of a layer of fibers. The layer of fibers is preferably provided on its other face with an antisweating coating.

11 Claims, 5 Drawing Sheets

SEALING MEMBRANE AND METHOD MAKING A SEALING MEMBRANE

This is a nationalization of PCT/BE00/00142 filed Nov. 30, 2000 and published in French.

The present invention relates to a waterproofing membrane provided on one face with an antisweating coating and a bituminous mass applied to the other face, and to its manufacture.

A waterproofing membrane provided with an antisweating coating and intended to be applied to a roof is known from the international patent application WO 97/24485. The antisweating coating, placed on the surface, in particular resolves the problem of sweating by preventing the migration of oil to the surface of the membrane. This sweating is due to variations in temperature and to the action of ultraviolet radiation. This sweating is also the cause of browning of rainwater and corrosion of the metals used in the rainwater collection. This is because the oils which have migrated to the surface mix with the rainwater, thus causing it to brown. These phenomena are reduced by means of the use of such a membrane.

When the sealing membrane provided with an antisweating coating is placed as a roof cladding, it is ensured that the antisweating coating is on the surface. Two juxtaposed strips are welded or bonded to each other whilst superimposing them along their edges Where the join is made. One problem has however been found at this join. This is because the layer of bitumen of the top membrane is in contact with the antisweating coating. As the antisweating coating prevents the migration of oil beyond this layer, this oil will accumulate at the joint, and may cause a phenomenon of delamination at this point.

The aim of the invention is to obtain a waterproofing membrane for which the durability and the resistance of the joints to the phenomenon of delamination are substantially improved.

To this end, the waterproofing membrane according to the invention is characterized in that the bituminous mass comprises at least one olefinic polymer with an intrinsic crystallinity.

The presence of this olefinic polymer stabilizes the oils in the bituminous mass better because of its intrinsic crystallinity related to its macromolecular structure and to its chemical composition. In this way, the oils are kept in the crystalline zones, thus substantially limiting their ability to migrate under the effect of an increase in temperature. The limitation of this migration will then in its turn result in a limitation of the phenomenon of delamination and will give greater durability to the joint between two juxtaposed membranes. In addition, the flexibility of the waterproofing membrane when cold will be maintained over time. It should be noted that the olefinic polymer used has an intrinsic crystallinity and a chemical composition which are different from the isotactic polypropylene normally used in the bituminous mass.

Mixing a bituminous mass with thermoplastic polyolefins is known as such from the patent application EP 0 937 750. The solution proposed in this patent application resolves a problem of incorporating polyolefins with a bituminous mass in order to obtain bituminous compositions of the bitumen-polymer type in homogeneous phase. For this purpose this patent application teaches degrading the molecular mass of the high-crystallinity thermoplastic polyolefins. However, nothing in this document teaches a solution to a problem of resistance of the joints to the phenomenon of delamination.

According to a preferential embodiment of the invention, the bituminous mass comprises a quantity of olefinic polymers with an intrinsic crystallinity between 1% and 5% of the concentration of the polymers present in the bituminous mass. Thus the resistance of the joints measured after thermal aging is sufficient to meet the requirements defined in the European Directives peculiar to the reinforced sealing coatings of APP polymer bitumen.

In a preferred embodiment of the invention, the bituminous mass is characterized in that it comprises a quantity of olefinic polymers having an intrinsic crystallinity greater than 5% of the concentration of the polymers present in the bituminous mass. This proportion ensures the durability of the waterproofing membrane, by keeping its performance with regard to the strength of the joints and the flexibility when cold at least constant over time.

According to a preferred embodiment of the invention, the olefinic polymers with an intrinsic crystallinity comprise ethylene and propylene monomers. These polymers ensure a compatibility with the bitumen which is greater than that obtained with isotactic polypropylenes. They also make it possible to keep good flexibility when cold.

According to another embodiment according to the invention, the olefinic polymers with an intrinsic crystallinity comprise an ethylene monomer to which there is added at least one unsaturated olefinic monomer in which the number of carbon atoms is greater than 3. These polymers also allow this greater compatibility and preserve flexibility when cold.

The invention also relates to a bituminous mass to be used for the manufacture of a waterproofing membrane according to the invention.

In addition, the invention also relates to a method of manufacturing a waterproofing membrane according to which a bituminous mass is applied to one face of a first layer of fibers, which first layer is provided on its other face with an antisweating coating.

Generally, the impregnation of one or more layers of fibers with a bituminous mass in order to manufacture waterproofing membranes is done by impregnating the layer or layers of fibers by immersing in a tank filled with the bituminous mass or by a deposition of a bituminous mass carried out by gravity effect. These methods described in the prior art have the drawback of causing the overflow of the bituminous mass over the edges of the layer to be impregnated, which soils the face which is not to be impregnated as well as the cylinders on which the layer of fibers is transported. This is all the more a problem if the layer which cannot be impregnated is the one where the antisweating coating is applied. In addition, the known method may give rise to faulty impregnation of the layer or layers and therefore a risk of delamination.

The bituminous mass soiling contaminating the cylinders on the manufacturing line may cause many square meters of manufactured waterproofing membrane to be rejected.

Another aim of the invention is to provide a method of manufacturing a waterproofing membrane which affords a solution to the above mentioned problem.

To this end, a method of manufacturing a waterproofing membrane according to the invention is characterized in that said bituminous mass is applied by coating from below the surface to be coated on the bottom face of the first layer of fibers. The coating of the bottom face from below makes it possible not to soil the top face where the antisweating coating is applied. In addition, the force of gravity will enable the excess bituminous mass to fall into the bath again and not to soil the cylinders.

Preferably, the method according to the invention is characterized in that a layer of glass fibers is used as a first layer. This gives the membrane good properties of stability and tensile strength.

According to another embodiment of the method according to the invention, this is characterized in that the strength of the joints of these waterproofing membranes is at least 50 N/5 cm. The use of a different bituminous mass makes it possible to choose a generally less expensive one which is in contact with the roof.

Hereinafter, the invention will be described in more detail using the accompanying drawings. In the drawings.

A waterproofing membrane in particular provided with an antisweating coating placed on the surface according to the invention is manufactured by applying a bituminous mass to one or more layers of fibers. The antisweating coating reduces the effects of the heat and ultraviolet radiation on the membrane. This is because this antisweating coating considerably limits the migration beyond the antisweating coating of the oils present in the bituminous mass. Thus the effect of aging of the membrane caused by heat and ultraviolet radiation is reduced. The antisweating coating so to speak shelters the bituminous mass from the ultraviolet radiation.

As the migration of the oils beyond the coating is prevented by the antisweating coating, the migrating oil can merely accumulate at the joint between the bituminous mass and the antisweating coating to which the edge of the membrane is applied. This accumulation of oil at the joint may cause a delamination of the joint and therefore lead to infiltration of water.

When the membrane is not provided with an antisweating coating, the migration of oil may also take place in the direction of the top face of the membrane. The oil thus released, after degradation under the effect of ultraviolet radiation, may mix with rainwater and be found in the drainage water and could cause corrosion of the discharge pipes.

It has now been found that the problem of migration of oil in the membrane could be reduced by modifying the bituminous mass which is used for manufacturing the membrane. To this end, the bituminous mass according to the invention comprises substances situated in the following range:

15 to 85% bitumen, and
15 to 85% polymers comprising:

5 to 85% atactic polypropylenes,
0 to 10% isotactic polypropylenes,
1 to 50% olefinic polymers with an intrinsic crystallinity,
0 to 49% filler (mineral or organic).

An example of a preferential composition of the bituminous mass according to the invention is situated in the range given below:

| | |
|---|---|
| bitumen: | 45 to 85%, |
| atactic polypropylenes: | 10 to 50%, |
| isotactic polypropylenes: | 0 to 3%, |
| olefinic polymers having an intrinsic crystallinity: | 1 to 10%, |
| filler: | 5 to 25%. |

A typical example of a composition of the bituminous mass of the invention is given below:

| | |
|---|---|
| bitumen: | 55%, |
| atactic polypropylenes: | 17.5%, |
| isotactic polypropylenes: | 0.6%, |
| olefinic polymers with an intrinsic crystallinity: | 6.9%, |
| filler: | 20%. |

The olefinic polymers with an intrinsic crystallinity are preferably synthesis polymers but can also be olefinic polymers obtained by applying the method as described in EP-A 0 937 750. The bitumen used preferably has a penetrability at 25° C. of between 60 and 200 tenths of a millimeter.

The olefinic polymers with intrinsic crystallinity are formed principally by ethylene and propylene monomers. However, and according to another embodiment, these olefinic polymers can also be formed by an ethylene monomer to which there has been added at least one unsaturated olefinic monomer in which the number of carbon atoms is greater than three. This last olefinic monomer is for example an octene.

Figure 1:
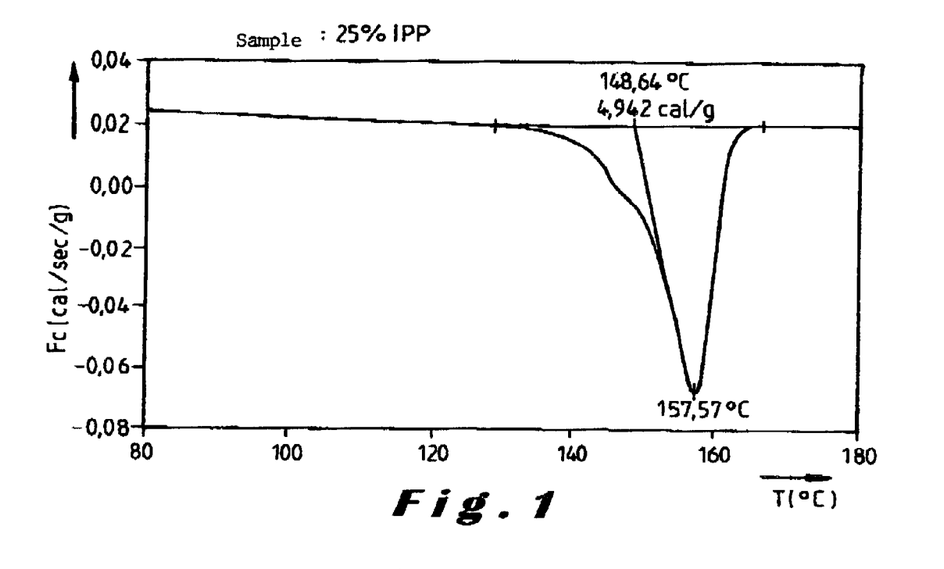
FIGS. 1 to 3 illustrate the heat flow according to temperature.
Figure 2:
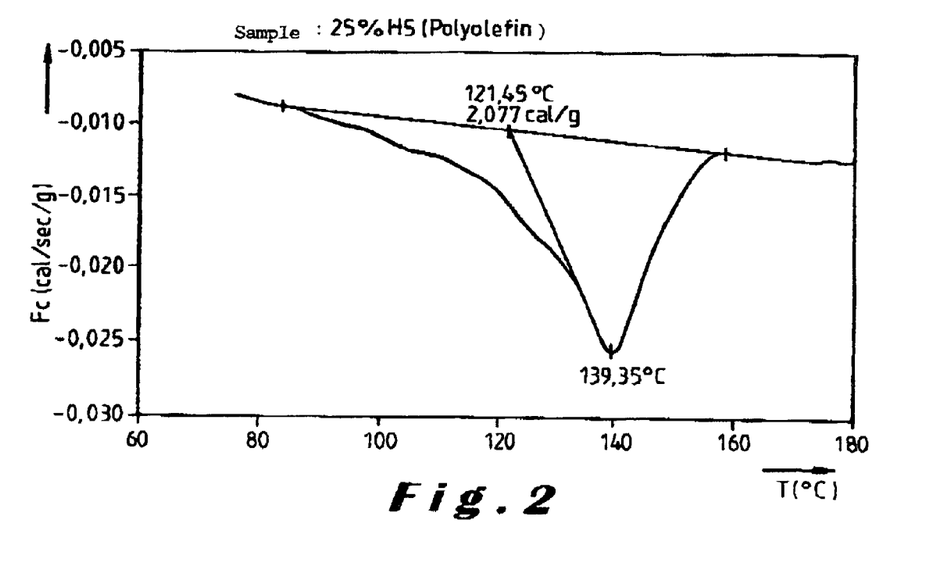
Figure 3:
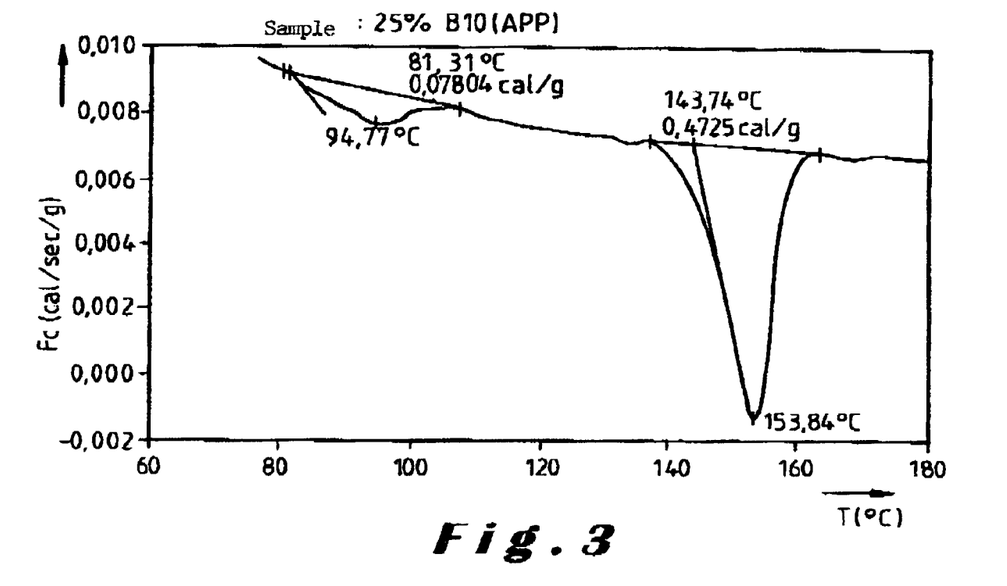

It should be noted that the olefinic polymers with an intrinsic crystallinity are distinguished from atactic and isotactic polymers by their physical and chemical properties. The technique of differential calorimetric analysis makes it possible to observe and quantify these chemical and physical changes which a polymer may undergo if this change releases or requires energy. Melting, that is to say passing from the crystalline phase to the molten state, is one example of this. FIGS. 1 to 3 illustrate respectively the flow of heat Fc (in cal/sec/g) as a function of the temperature T for an isotactic polypropylene (IPP=FIG. 1), an olefinic polymer with an intrinsic crystallinity (POC; FIG. 2) and an atactic polypropylene (APP; FIG. 3). In these figures it will be seen that, for an IPP, the melting peak is situated at approximately 157° C. whilst for a POC or respectively an APP, it is at approximately 139° C. or respectively 155° C.

Two parameters can be measured, namely:
the fusion zone
the enthalpy of the fusion.

The table set out below gives one example of data obtained according to the type of polymer mixed with the bitumen (75% bitumen–25% polymer).

| MIXTURE | FUSION ZONE | FUSION ENTHALPY Zone 1 | FUSION ENTHALPY Zone 2 |
|---|---|---|---|
| Bitumen + Atactic polypropylene (APP) | Zone 1: 81 to 103 Zone 2: 135 to 163 | 0.078 | 0.473 |
| Bitumen + Polyolefin with intrinsic crystallinity (a) | 84 to 158 | | 2.077 |
| Bitumen + IPP | 129 to 167 | — | 4.94 |

Zone 1 = 1st fusion peak
Zone 2 = 2nd fusion peak.
(a): polyolefin or ethylene and propylene monomer.

From the table and in FIG. 2 it will be observed that, for an olefinic polymer with an intrinsic crystallinity, the fusion zone is very broad compared with the IPP or APP and continues with a maximum situated for the chosen polymer at 135° C. When the olefinic polymer with intrinsic crystallinity is a polyethylene containing monomers in its structure where the carbon number is greater than 3, the maximum of the fusion zone will be situated between 45 and 110° C. according to the proportion of this monomer.

These olefinic polymers must constitute at least 1% of the polymers forming part of a bituminous mass for manufacturing a waterproofing membrane for the effects of their presence to be observable. This is because the presence of this type of olefinic polymer stabilizes the oils present in the bituminous mass, which prevents their migration in particular towards the interface between the bituminous mass and the antisweating coating when the sealing membrane is subjected to the action of ultraviolet radiation and heat.

The fact that the oil now hardly migrates at all is due to the fact that it is considerably better stabilized in the bituminous mass. The oil is maintained in the intrinsic crystallinity of the olefinic polymers which now form part of the bituminous mass.

In order to verify the improved properties of the waterproofing membrane according to the invention, it was subjected to a durability test, the protocol for which is described in the UEAtc (European Union for Technical Approval in Construction) directives for the approval of waterproofing coatings made from reinforced APP (atactic polypropylene) polymer bitumen.

The first criterion tested is the strength of the membrane joints over time, which represents the resistance to delamination of the joints between the membrane widths.

The principle of the test is to measure the difference in strength of the membrane joints between a new state and a state after accelerated thermal aging of these joints obtained in a ventilated oven maintained at a temperature of 80° C. for 28 days.

Figure 4:
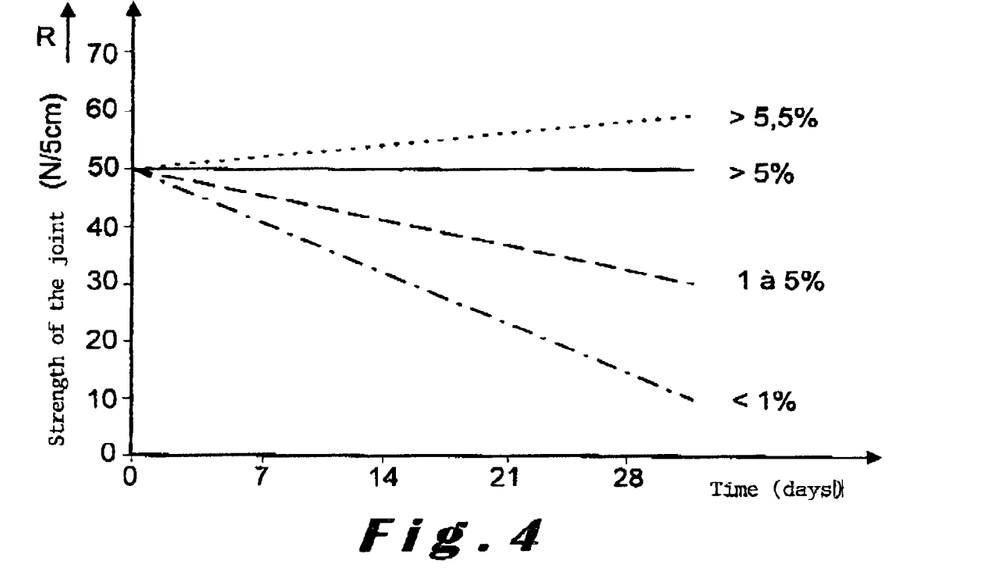
FIG. 4 is a graph presenting the results of a test of durability of the joints of the waterproofing membrane according to the invention identified by the value of the strength of the joints measured during an accelerated thermal aging.

FIG. 4 shows in a graph the difference in strength R of the joints during the accelerated thermal aging test (expressed in days J), for different percentages of olefinic polymers with an intrinsic crystallinity present in the bituminous mass. The graph shows a decrease in the strength of the joint of more than 50% of the value in the new state if the proportion of these polymers is less than 1%, which is not in accordance with the relevant European Directives. On the other hand, for a proportion of these polymers of between 1% and 5%, the decrease in the strength is less than 50% of the value in the new state, which is in conformity. For a proportion greater than 5% of these polymers, the strength of the joints is at least constant over time, whilst for a proportion greater than 5.5% the strength improves over time.

Another criterion used to define the durability of a waterproofing membrane is its flexibility under cold.

The principle of the test is to measure the temperature of non-cracking of the membrane subjected to the cold flexibility test, the test being carried out on a membrane in the new state and on a membrane which has undergone accelerated thermal aging in a ventilated oven maintained at a temperature of 80° C. for 28 days.

Figure 5:
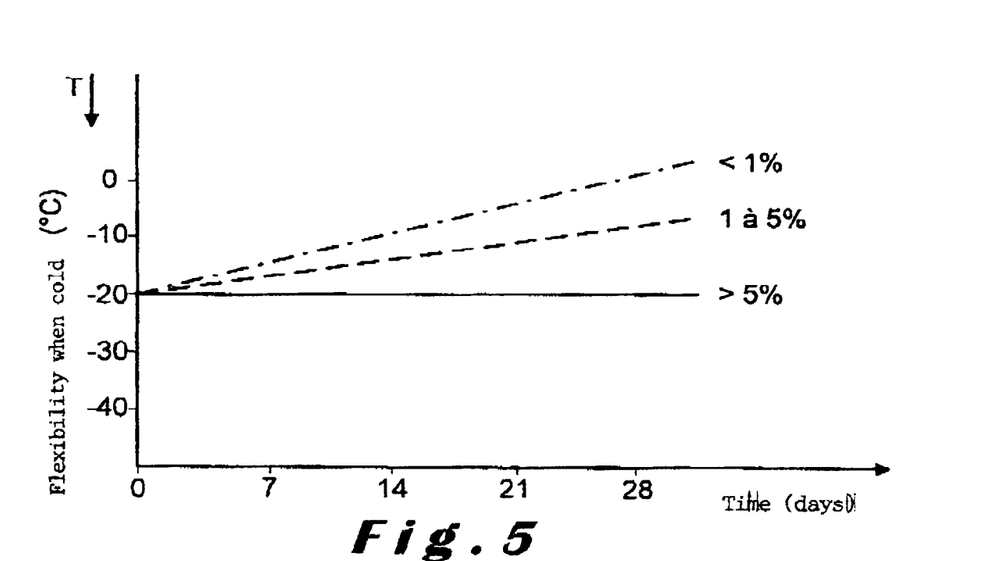
FIG. 5 is a graph presenting the results of a test on the durability of the flexibility when cold of the waterproofing membrane according to the invention identified by the value of the temperature of non-cracking of the membrane measured during an accelerated thermal aging.

FIG. 5 shows in the graph the change in the temperature T of non-cracking of the membrane, measured by the cold flexibility test, during the accelerated thermal aging test, for different proportions of olefinic polymers with an intrinsic crystallinity present in the bituminous mass. The graph shows a large drop in the cold flexibility compared with the new state if the proportion of these polymers is below 1%. On the other hand, for a proportion of these polymers of between 1% and 5%, the temperature of non-cracking tends to remain identical to that obtained in the new state and for a proportion greater than 5% of these polymers the temperature of non-cracking becomes constant over time.

The antisweating coating of the waterproofing membrane according to the invention can consist of a compound based on acrylic or based on polyvinyl acetate and a flame-retarding filler, or contain intumescent products which make it possible to obtain a waterproofing membrane in accordance with all the fire resistance standards described in international patent application WO97/24485.

In addition, the antisweating coating comprising an acrylic-urethane compound which meets the same criteria as those set out in the patent application WO97/24485.

The characteristics of the bituminous mass according to the invention do not impair the well-known antisweating and fire resistance performances of the international patent application WO97/24485.

A method of manufacturing a waterproofing membrane according to the invention will now be described and preferably comprises three steps.

Figure 6:
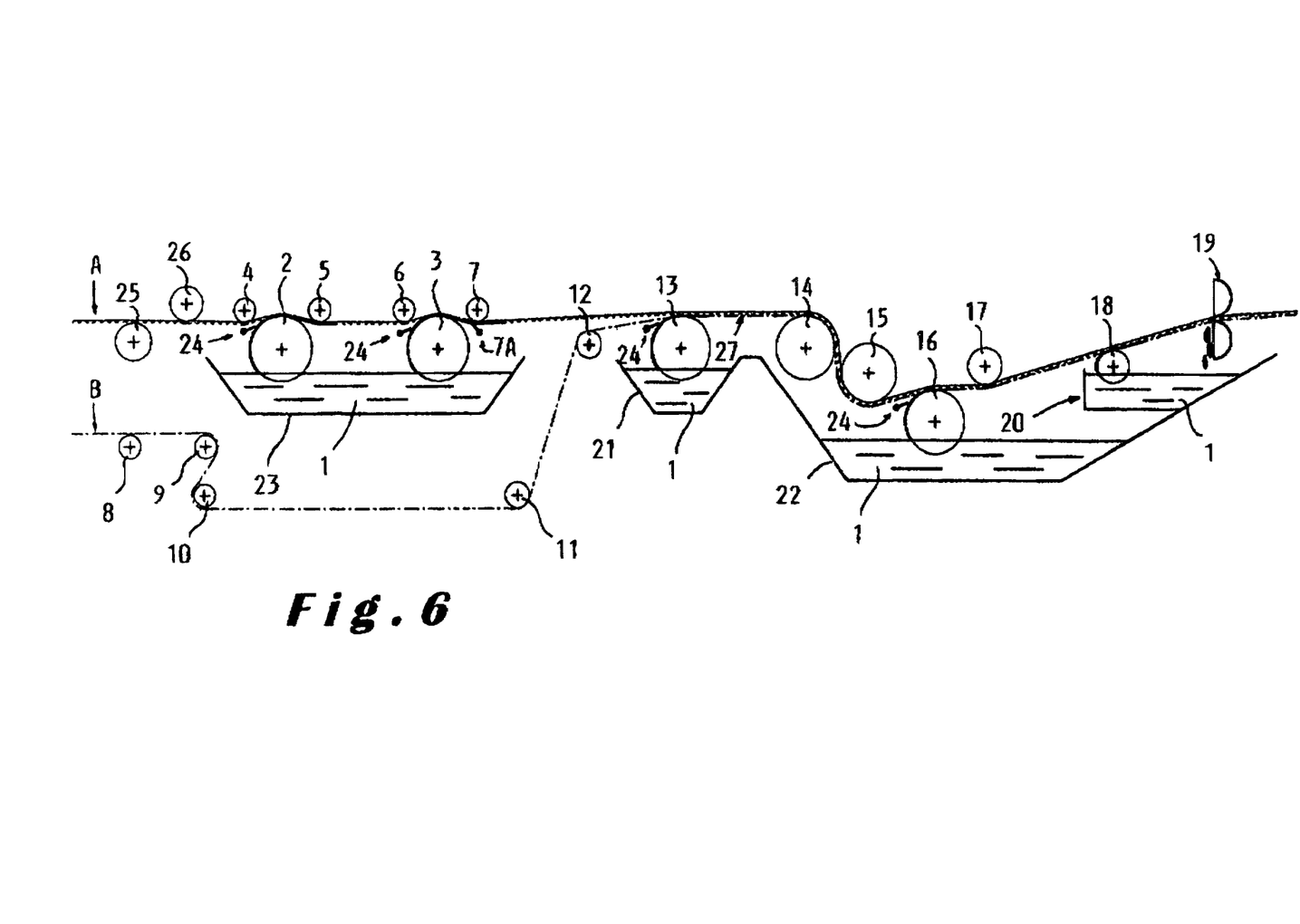
FIG. 6 illustrates schematically the second and third steps of the method of manufacturing a waterproofing membrane according to the invention.

FIG. 6 illustrates an example embodiment of the method of manufacturing a waterproofing membrane according to the invention.

The first step, which can be carried out in advance, comprises the coating of a first layer of fibers constituting the reinforcement A with an antisweating coating preferably composed of acrylic or polyvinyl acetate and a mineral or organic filler described in the international patent application WO97/24485. The covering formed in this way is then dried and then conducted to the following steps.

The second step consists of coating the bottom face of the reinforcement A, that is to say the face consisting of a first layer of fibers and which has not been coated with the antisweating coating, with a bituminous mass 1. Preferably, this bituminous mass consists of the components described above. It goes without saying that this bituminous mass can also be applied to a layer of fibers which is not provided with an antisweating coating.

The third step includes the assembly of the two reinforcements A and B and the coating of the bottom face of the reinforcement B, formed by a second layer of fibers, followed by the coating of the waterproofing membrane thus formed with a layer of bituminous mass.

The second and third steps provide good impregnation of the reinforcements A and B.

The reinforcement A is composed of a non-woven fabric with an antisweating coating on the surface; the non-woven fabric is preferably formed by a glass cloth, which gives better dimensional stability under temperature.

The reinforcement B is composed for example of a polyester non-woven fabric or a glass-polymer complex well known for this purpose.

In FIG. 6, the return cylinders 25 and 26 bring the reinforcement A, covered on its top face with an antisweating coating, above an impregnation tank 23 containing the bituminous mass 1 according to the invention.

The bottom face of the reinforcement A is then coated with the bituminous mass 1 coming from the impregnation tank 23 by means of the coating cylinders 2 and 3. These cylinders rotate in the impregnation tank 23 containing the bituminous mass 1 and are therefore loaded with bituminous mass and will impregnate the bottom face of the reinforcement A by coating. This method in addition allows a bituminous mass to fall again under gravity into the impregnation tank. The small cylinders 4, 5, 6, 7 make it possible to establish uniform contact of the surface of the reinforcement A on the coating cylinders 2 and 3. As these small cylinders do not come into contact with the bituminous mass, they cannot soil the antisweating coating.

The scrapers 24 regulate the quantity of bituminous mass 1 brought by the coating cylinder onto the bottom face of the reinforcement A.

At the same time as the coating of the bottom face of the reinforcement A with the bituminous mass 1, the reinforcement B is, by means of return cylinders 8, 9, 10, 11, 12, brought as far as the coating cylinder 13 which allows the coating of the bottom face of the reinforcement B with the bituminous mass coming from the impregnation tank 21. This cylinder also applies the reinforcement B against the bottom face of the reinforcement A previously coated with bituminous mass 1. The reinforcement B is brought on the coating cylinder 13, which enables the reinforcement B to be coated with bitumen from below and to be applied against the reinforcement A. The scraper 24 regulates the quantity of bituminous mass 1 brought on the bottom face of the reinforcement B. The reinforcements A and B, assembled with bituminous mass 1 interposed between the two reinforcements, are then brought by return cylinders 14, 15 onto a coating cylinder 16 which coats the bottom face of the waterproofing membrane 27 consisting, with the bituminous mass coming from the impregnation tank 22 situated under the coating cylinder 16. This bituminous mass can either have a composition equal to that present in the tanks 23, 21 or be of a different composition. A scraper 24 regulates the quantity of bituminous mass coated on the bottom face of the waterproofing membrane 27 consisting of the two reinforcements joined together by the bituminous mass. The sealing membrane 27 thus formed is said to have a dual-reinforced structure.

The coating cylinder 18 once again coats the bottom face of the waterproofing membrane 27 with a quantity of bituminous mass coming from the impregnation tank 20, so as to obtain a chosen thickness of bitumen. The passage of the membrane through a calibrated calendar 19 makes it possible to obtain the required thickness of membrane. Where necessary, a self-adhesive composition is applied on the surface of the bituminous mass, that is to say on the face opposite to the one where the antisweating coating is applied. This is for example achieved by means of another cylinder (not shown in the drawings) situated downstream of the calendar 19.

The excess of bitumen, whether at the scrapers 24 or the calendar 19, is recovered in the corresponding impregnation tank, situated under the scrapers and under the calendar, and can be reused during the process of manufacturing the waterproofing membrane.

The main advantage of this coating method carried out from below using cylinders is avoiding soiling the top face of the waterproofing membrane formed by the antisweating coating and to obtain an even impregnation of the reinforcements A and B since the reinforcements are impregnated separately before being joined, as each time, from below. The cylinders 4, 5, 6, 7 and 17 which are in contact with the coated side of the reinforcement A remain clean and do not soil the antisweating coating placed on the surface of the waterproofing membrane produced according to this method.

In one example application, the bituminous mass 1 is at a temperature of 180° C. and must have a viscosity of at least 4000 cPs throughout the duration of the coating of the reinforcements.

Complying with these conditions makes it possible to obtain a waterproofing membrane whose bottom face has a smooth even surface and an external antisweating surface which remains clean.

The waterproofing membrane provided with an antisweating coating 27, manufactured by the method according to the present invention, can also comprise layers of bituminous mass with different compositions, the impregnation tank 23 being able to contain a bituminous mass with a composition different from that of the impregnation tanks 20, 21, 22. For example, the impregnation tanks 20 and 22 may contain self-adhesive masses. It also possible to apply a self-adhesive coating at the end of the process.

Figure 7:
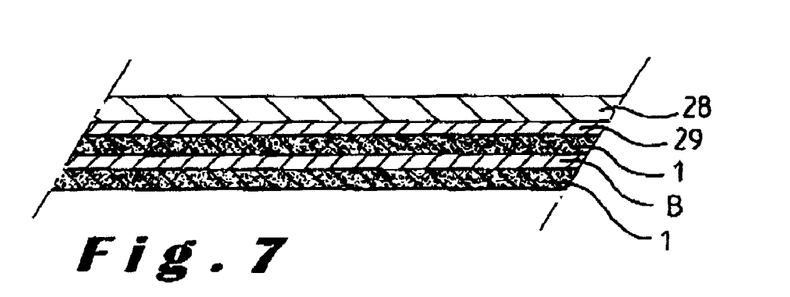
FIG. 7 illustrates, to a larger scale, a view in section through a waterproofing membrane obtained by applying the method illustrated in FIG. 6.

FIG. 7 illustrates, to a larger scale, a view in section through a waterproofing membrane 27 according to the invention. The top face consists of an antisweating coating 28 coated on a first layer of fibers 29 constituting the reinforcement A on the bottom face of which the bituminous mass 1 is coated, then the reinforcement B is applied to the bituminous mass 1 and is itself coated with bituminous mass 1. The reinforcement B is thus completely impregnated with the bituminous mass 1.

Figure 8:
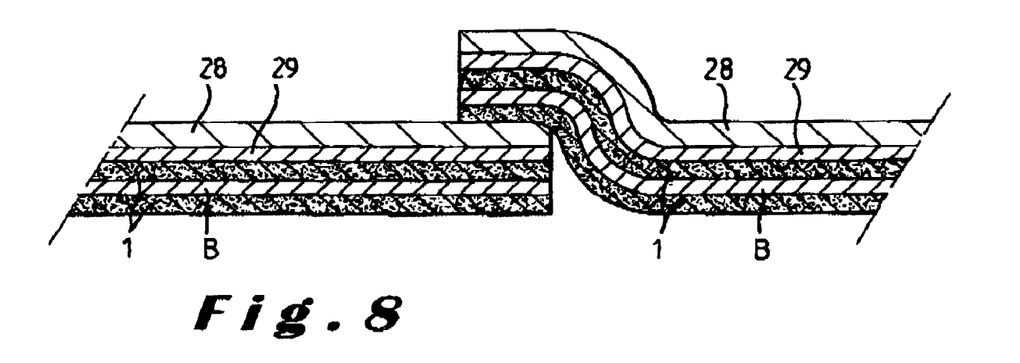
FIG. 8 illustrates, to a larger scale, a view in section through two widths of waterproofing membrane which are superimposed at their edges.

FIG. 8 illustrates, to a larger scale, a view in section through two widths of waterproofing membrane whose edges are superimposed. The edges of the widths are superimposed and then welded with heat or adhesively bonded. The composition of the bituminous mass of the invention makes it possible to produce the joints without fearing any problems of delamination since the migration of oil at the interfaces between the widths is limited by virtue of the olefinic polymers with an intrinsic crystallinity, forming part of the bituminous mass according to the invention.

It must also be emphasized that the waterproofing membrane according to the invention has a low thermal conductivity which may be explained by the low rate of energy dissipation at the antisweating coating which has a barrier effect, which gives rise to better hot weldability of the widths of the membrane. This low thermal conductivity gives better control of the production of the joints and improves the esthetic appearance thereof.

The invention claimed is:

1. A waterproofing membrane comprising a first layer of fibers having
   a) a first face with an antisweating coating thereon, wherein the first face can form a top face of the membrane when applied on a roof, and, opposing the first face,
   b) a second face with a bituminous mass thereon, comprising bitumen, in an amount of 15–85% by weight of the total bituminous mass, and polymers, comprising isotactic polymers, atactic polymers at an amount of 5–85% by weight of the polymers, and olefinic polymers having intrinsic crystallinity and forming at least 1% by weight of the polymers, the olefinic polymers comprising a polyethylene having monomers where the carbon number is greater than three, the atactic polymers having a first fusion zone extending continuously within a first temperature range situated between 135 to 163° C. and a second fusion zone extending continuously within a second temperature range of 81 to 103° C. and the olefinic polymers having a fusion zone extending continuously within a third temperature range of 45 to 110° C., for each of said polymers an enthalpy-related change occurs over the whole range of the respective fusion zone and reaches a maximum within the respective temperature range.

2. The waterproofing membrane as claimed in claim 1, wherein the olefinic polymer further comprises propylene monomers.

3. The waterproofing membrane as claimed in claim 1, wherein the olefinic monomer is an octene.

4. The waterproofing membrane as claimed in claim 1, wherein the membrane is self-adhesive.

5. A method for manufacturing a waterproofing membrane, the method comprising:

applying an antisweating coating on a first face of a first layer of fibres and;

applying, by a bottom-up coating process on a second face of the first layer of fibres, the second face being opposite to the first face, a bituminous mass comprising a) bitumen, in an amount of 15–85% by weight of the total bituminous mass, and b) polymers, comprising isotactic polymers, atactic polymers at an amount of 5–85% by weight of the polymers, and olefinic polymers having intrinsic crystallinity and forming at least 1% by weight of the polymers, the olefinic polymers comprising a polyethylene having monomers where the carbon number is greater than three, the atactic polymers having a first fusion zone extending continuously within a first temperature range situated between 135 to 163° C. and a second fusion zone extending continuously within a second temperature range of 81 to 103° C. and the olefinic polymers having a fusion zone extending continuously within a third temperature range of 45 to 110° C., for each of said polymers an enthalpy-related change occurs over the whole range of the respective fusion zone and reaches a maximum within the respective temperature range.

6. The method as claimed in claim 5, further comprising applying a second layer of fibers to the bituminous mass and applying a further bituminous mass to the second layer of fibers.

7. The method as claimed in claim 6, further comprising applying a still further bituminous mass to the further bituminous mass, the further bituminous mass having a different composition than the still further bituminous mass.

8. The method as claimed in claim 5, wherein the first layer of fibers is a sheet of glass fibers.

9. The method as claimed in claim 8, further comprising applying a second layer of fibers to the bituminous mass and applying a further bituminous mass to the second layer of fibers.

10. The method as claimed in claim 9, further comprising applying a still further bituminous mass to the further bituminous mass, the further bituminous mass having a different composition than the still further bituminous mass.

11. The method as claimed in claim 5, further comprising applying a self-adhesive composition to the surface of the bituminous mass.

* * * * *